US008493535B2

(12) United States Patent
Enomoto

(10) Patent No.: US 8,493,535 B2
(45) Date of Patent: *Jul. 23, 2013

(54) LIQUID CRYSTAL DISPLAY DEVICE

(75) Inventor: Hiromi Enomoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 311 days.

This patent is subject to a terminal disclaimer.

(21) Appl. No.: 13/001,635

(22) PCT Filed: May 13, 2009

(86) PCT No.: PCT/JP2009/002075
§ 371 (c)(1),
(2), (4) Date: Dec. 28, 2010

(87) PCT Pub. No.: WO2010/007716
PCT Pub. Date: Jan. 21, 2010

(65) Prior Publication Data
US 2011/0102721 A1 May 5, 2011

(30) Foreign Application Priority Data

Jul. 14, 2008 (JP) ................................. 2008-182497

(51) Int. Cl.
G02F 1/1335 (2006.01)
(52) U.S. Cl.
USPC .................. 349/137; 349/56; 349/84; 349/96; 349/122
(58) Field of Classification Search
USPC ................................. 349/56, 84, 96, 122, 137
See application file for complete search history.

(56) References Cited

U.S. PATENT DOCUMENTS

| 6,912,028 B2 * | 6/2005 | Yoshii et al. ................... 349/114 |
| 8,139,177 B2 * | 3/2012 | Nishizawa ....................... 349/58 |
| 2009/0122223 A1 | 5/2009 | Hayano et al. |

FOREIGN PATENT DOCUMENTS

| JP | 3-86325 U | 8/1991 |
| JP | 8-94991 A | 4/1996 |
| JP | 11-38395 A | 2/1999 |
| JP | 2000-79837 A | 3/2000 |
| JP | 2005-164890 A | 6/2005 |

OTHER PUBLICATIONS

Enomoto, "Liquid Crystal Display Device", U.S. Appl. No. 13/141,088, filed Jun. 21, 2011.
Official Communication issued in International Patent Application No. PCT/JP2009/002075, mailed on Jul. 7, 2009.

* cited by examiner

Primary Examiner — Jennifer Doan
(74) Attorney, Agent, or Firm — Keating & Bennett, LLP

(57) ABSTRACT

It is an object of the present invention to provide a liquid crystal display device with a good display quality, and a manufacturing method of such a liquid crystal display device. A liquid crystal display device (10) includes a liquid crystal display panel (11) with a display surface (20) defining a recessed curved surface having curvature of 1/500-1/50 (1/mm), and with a scattering section which is arranged parallel to the display surface (20), which defines a recessed curved surface having curvature of 1/500-1/50 (1/mm), and in which a plurality of elongated regions (A-C) having different haze values are arranged in parallel with each other from a middle section of the curved surface toward both end sections in the curving direction. The haze values of the plurality of elongated regions (A-C) arranged in parallel with each other vary in a step-wise manner from the middle section of the curved surface toward the both end sections in the curving direction.

16 Claims, 8 Drawing Sheets

LIQUID CRYSTAL DISPLAY DEVICE

TECHNICAL FIELD

The present invention relates to a liquid crystal display device.

BACKGROUND ART

Examples of liquid crystal display devices used for mobile devices such as mobile phones include flat panels, curved panels, and liquid crystal display modules having flexibly-changeable shape. Recently, such liquid crystal display devices have been extensively studied and developed. As disclosed in, e.g., Patent Document 1, the liquid crystal display device is manufactured by bending a super-thin glass substrate of a liquid crystal panel, or by curving a display surface of, e.g., a flexible plastic substrate instead of the glass substrate.

CITATION LIST

Patent Document
PATENT DOCUMENT 1: Japanese Patent Publication No. 2000-79837

SUMMARY OF THE INVENTION

Technical Problem

However, a problem is caused, in which the curved display surface results in a contrast difference in each section of the display surface due to, e.g., diffused reflection and reflected glare of external light on the display surface, thereby degrading a display quality.

The present invention has been made in view of the foregoing, and it is an object of the present invention to provide a liquid crystal display device with a good display quality, and a manufacturing method of such a liquid crystal display device.

Solution to the Problem

A liquid crystal display device of the present invention includes a liquid crystal display panel with a display surface defining a recessed curved surface having curvature of $1/500$-$1/50$ (1 /mm), and with a scattering section which is arranged parallel to the display surface, which defines a recessed curved surface having curvature of $1/500$-$1/50$ (1 /mm), and in which a plurality of elongated regions having different haze values are arranged in parallel with each other from a middle section of the curved surface toward both end sections in the curving direction. In the liquid crystal display device, the haze values of the plurality of elongated regions arranged in parallel with each other vary in a step-wise manner from the middle section of the curved surface toward the both end sections in the curving direction.

In the liquid crystal display device of the present invention, the elongated regions of the scattering section may be a first region provided in the middle section of the curved surface, where the haze value is equal to or greater than 50% and less than 80%; second regions adjoining the middle section in a direction toward the both end sections of the curved surface, where the haze value is equal to or greater than 30% and less than 50%; and third regions adjoining the second regions in the direction toward the both end sections of the curved surface, where the haze value is equal to or greater than 0% and less than 30%. The elongated regions of the scattering section may be arranged so that the haze values are decreased from the middle section toward the both end sections in the curving direction.

In the liquid crystal display device of the present invention, the elongated regions of the scattering section may be a first region provided in the middle section of the curved surface, where the haze value is equal to or greater than 0% and less than 30%; second regions adjoining the middle section in a direction toward the both end sections of the curved surface, where the haze value is equal to or greater than 30% and less than 50%; and third regions adjoining the second regions in the direction toward the both end sections of the curved surface, where the haze value is equal to or greater than 50% and less than 80%. The elongated regions of the scattering section may be arranged so that the haze values are increased from the middle section toward the both end sections in the curving direction.

A liquid crystal display device of the present invention includes a liquid crystal display panel with a display surface defining a raised curved surface having curvature of $1/500$-$1/50$ (1 /mm), and with a scattering section which is arranged parallel to the display surface, which defines a raised curved surface having curvature of $1/500$-$1/50$ (1 /mm), and in which a plurality of elongated regions having different haze values are arranged in parallel with each other from a middle section of the curved surface toward both end sections in the curving direction. In the liquid crystal display device, the haze values of the plurality of elongated regions arranged in parallel with each other vary in a step-wise manner from the middle section of the curved surface toward the both end sections in the curving direction.

In the liquid crystal display device of the present invention, the elongated regions of the scattering section may be a first region provided in the middle section of the curved surface, where the haze value is equal to or greater than 0% and less than 30%; second regions adjoining the middle section in a direction toward the both end sections of the curved surface, where the haze value is equal to or greater than 30% and less than 50%; and third regions adjoining the second regions in the direction toward the both end sections of the curved surface, where the haze value is equal to or greater than 50% and less than 80%. The elongated regions of the scattering section may be arranged so that the haze values are increased from the middle section toward the both end sections in the curving direction.

In the liquid crystal display device of the present invention, the elongated regions of the scattering section may be a first region provided in the middle section of the curved surface, where the haze value is equal to or greater than 50% and less than 80%; second regions adjoining the middle section in a direction toward the both end sections of the curved surface, where the haze value is equal to or greater than 30% and less than 50%; and third regions adjoining the second regions in the direction toward the both end sections of the curved surface, where the haze value is equal to or greater than 0% and less than 30%. The elongated regions of the scattering section may be arranged so that the haze values are decreased from the middle section toward the both end sections in the curving direction.

In the liquid crystal display device of the present invention, the scattering section may be a polarizer having a surface to which an anti-glare process is applied.

In the liquid crystal display device of the present invention, the polarizers may be provided on front and rear sides of the liquid crystal display panel.

In the liquid crystal display device of the present invention, the scattering section may be a haze adhesive which is an adhesive containing scattering particles.

In the liquid crystal display device of the present invention, the haze adhesive may be used for bonding of the polarizer provided on the rear side of the liquid crystal display panel.

In the liquid crystal display device of the present invention, the haze adhesive may be used for bonding of stacked members configuring the polarizer provided on the rear side of the liquid crystal display panel.

A liquid crystal display device of the present invention includes a liquid crystal display panel with a display surface defining a recessed curved surface having curvature of 1/500-1/50 (1 /mm), and with a reflection section which is arranged parallel to the display surface, which defines a recessed curved surface having curvature of 1/500-1/50 (1 /mm), and in which a plurality of elongated regions having different light reflectivities are arranged in parallel with each other from a middle section of the curved surface toward both end sections in the curving direction. The light reflectivities of the plurality of elongated regions arranged in parallel with each other vary in a step-wise manner from the middle section of the curved surface toward the both end sections in the curving direction.

In the liquid crystal display device of the present invention, the elongated regions of the reflection section may be a first region provided in the middle section of the curved surface, where the light reflectivity is equal to or greater than 0% and less than 5%; second regions adjoining the middle section in a direction toward the both end sections of the curved surface, where the light reflectivity is equal to or greater than 5% and less than 10%; and third regions adjoining the second regions in the direction toward the both end sections of the curved surface, where the light reflectivity is equal to or greater than 10% and less than 15%. The elongated regions of the reflection section may be arranged so that the light reflectivities are increased from the middle section toward the both end sections in the curving direction.

In the liquid crystal display device of the present invention, the elongated regions of the reflection section may be a first region provided in the middle section of the curved surface, where the light reflectivity is equal to or greater than 10% and less than 15%; second regions adjoining the middle section in a direction toward the both end sections of the curved surface, where the light reflectivity is equal to or greater than 5% and less than 10%; and third regions adjoining the second regions in the direction toward the both end sections of the curved surface, where the light reflectivity is equal to or greater than 0% and less than 5%. The elongated regions of the reflection section may be arranged so that the light reflectivities are decreased from the middle section toward the both end sections in the curving direction.

A liquid crystal display device of the present invention includes a liquid crystal display panel with a display surface defining a raised curved surface having curvature of 1/500-1/50 (1 /mm), and with a reflection section which is arranged parallel to the display surface, which defines a raised curved surface having curvature of 1/500-1/50 (1 /mm), and in which a plurality of elongated regions having different light reflectivities are arranged in parallel with each other from a middle section of the curved surface toward both end sections in the curving direction. The light reflectivities of the plurality of elongated regions arranged in parallel with each other vary in a step-wise manner from the middle section of the curved surface toward the both end sections in the curving direction.

In the liquid crystal display device of the present invention, the elongated regions of the reflection section may be a first region provided in the middle section of the curved surface, where the light reflectivity is equal to or greater than 10% and less than 15%; second regions adjoining the middle section in a direction toward the both end sections of the curved surface, where the light reflectivity is equal to or greater than 5% and less than 10%; and third regions adjoining the second regions in the direction toward the both end sections of the curved surface, where the light reflectivity is equal to or greater than 0% and less than 5%. The elongated regions of the reflection section may be arranged so that the light reflectivities are decreased from the middle section toward the both end sections in the curving direction.

In the liquid crystal display device of the present invention, the elongated regions of the reflection section may be a first region provided in the middle section of the curved surface, where the light reflectivity is equal to or greater than 0% and less than 5%; second regions adjoining the middle section in a direction toward the both end sections of the curved surface, where the light reflectivity is equal to or greater than 5% and less than 10%; and third regions adjoining the second regions in the direction toward the both end sections of the curved surface, where the light reflectivity is equal to or greater than 10% and less than 15%. The elongated regions of the reflection section may be arranged so that the light reflectivities are increased from the middle section toward the both end sections in the curving direction.

In the liquid crystal display device of the present invention, the reflection section may be a polarizer having a surface to which an anti-reflection process is applied.

In the liquid crystal display device of the present invention, the polarizers may be provided on front and rear sides of the liquid crystal display panel.

Advantages of the Invention

According to the present invention, a liquid crystal display device with a good display quality, and a manufacturing method of such a liquid crystal display device can be provided.

DESCRIPTION OF EMBODIMENTS

A configuration and a manufacturing method of a liquid crystal display device of embodiments of the present invention will be described in detail below with reference to the drawings. Note that the present invention is not limited to the embodiments described below.

(First Embodiment)
(Configuration of Liquid Crystal Display Device 10)

Figure 1:
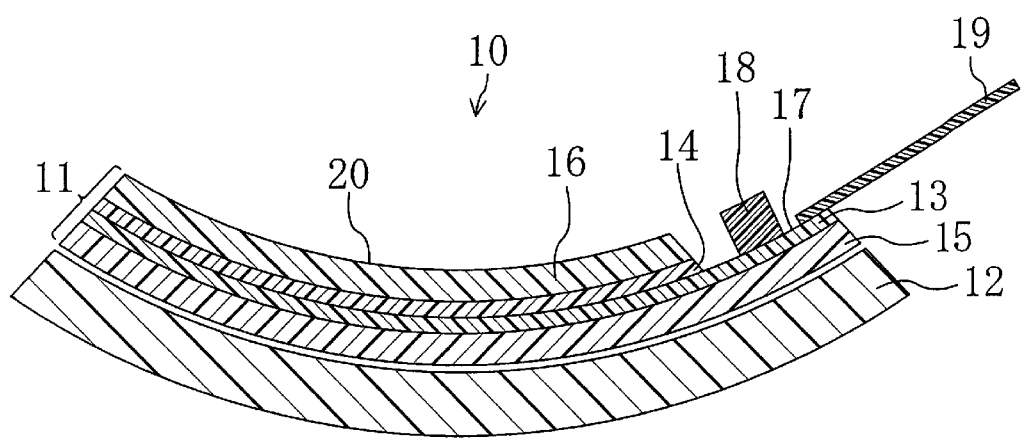
FIG. 1 is a cross-sectional view of a liquid crystal display device of a first embodiment.

FIG. 1 is a cross-sectional view of a liquid crystal display device 10 of a first embodiment of the present invention. The liquid crystal display device 10 includes a liquid crystal display panel 11 and a backlight 12.

Figure 2:
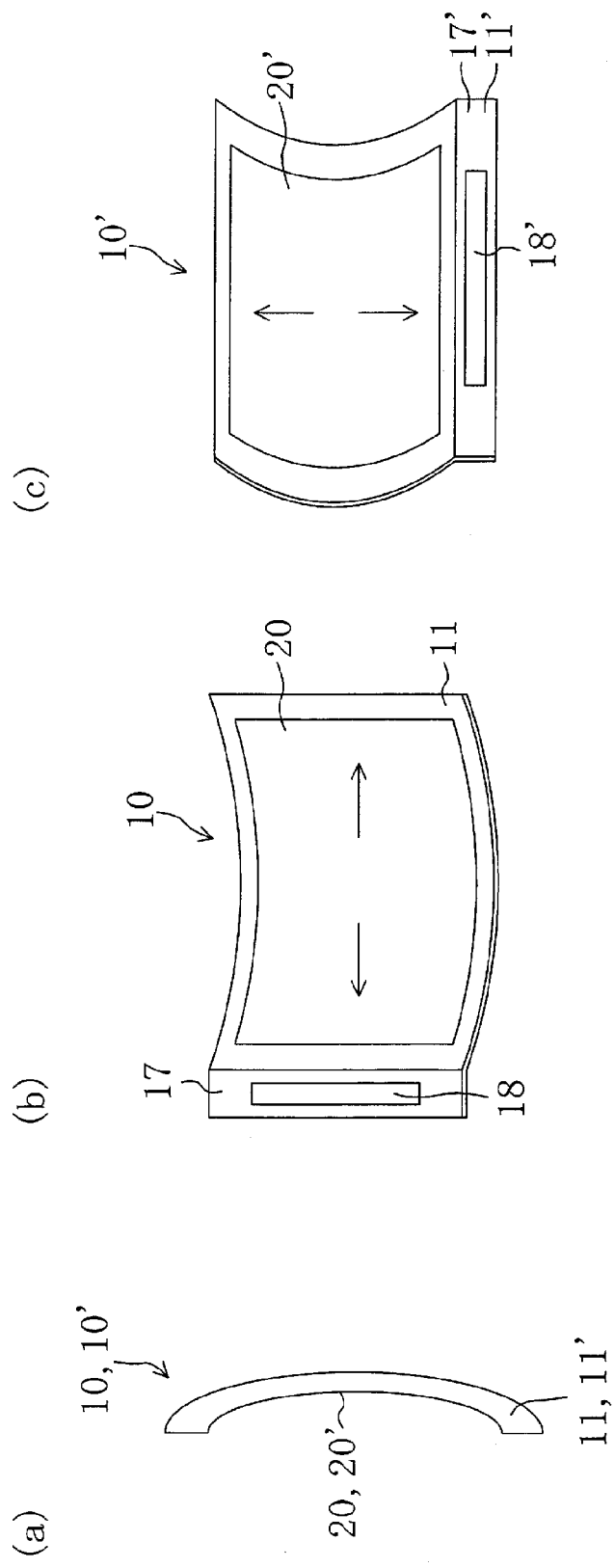
FIG. 2(a) is a side view of a liquid crystal display panel having a recessed curved display surface.
FIG. 2(b) is a plan view of the liquid crystal display panel which is curved in a longitudinal direction so as to define the recessed surface.
FIG. 2(c) is a plan view of the liquid crystal display panel which is curved in a lateral direction so as to define the recessed surface.

The liquid crystal display panel 11 includes a thin-film transistor substrate 13, a color filter substrate 14, and a liquid crystal layer (not shown in the figure) interposed between the thin-film transistor substrate 13 and the color filter substrate 14; as well as a front-side polarizer 16 and a rear-side polarizer 15 arranged on outer surfaces of the thin-film transistor substrate 13 and the color filter substrate 14. Such members configuring the liquid crystal display panel 11 have flexibility as described later, and the entire liquid crystal display panel 11 is curved and fixed. A display surface of the liquid crystal display panel 11 defines a recessed curved surface having curvature of 1/500-1/50 (1 /mm) Specifically, as illustrated in FIG. 2(a), the recessed curved surface is defined on the display surface 20 side of the liquid crystal display panel 11. As illustrated in FIG. 2(b), a curving direction is a longitudinal direction (direction indicated by arrows in FIG. 2(b)) of the liquid crystal display panel 11. In addition, as in a liquid crystal display device 10' illustrated in FIG. 2(c), a display surface 20' may define a recessed curved surface, and a curving direction may be a lateral direction (direction indicated by arrows in FIG. 2(c)) of a liquid crystal display panel 11'. In FIG. 2(c), a reference number "17'" represents an extra region of the thin-film transistor substrate, and a reference number "18'" represents a drive circuit formed on the extra region 17'.

The curved surface is not limited to the above, and, e.g., a rectangular display surface of a liquid crystal display panel is curved in an oblique direction so as to define a recessed surface.

The thin-film transistor substrate 13 is a flexible substrate made of, e.g., resin and glass. On the flexible substrate, a plurality of source wires are formed so as to extend parallel to each other, and a plurality of gate wires are formed so as to extend perpendicular to the source wires. The source and gate wires define a plurality of rectangular pixels. That is, the plurality of pixels are arranged in a matrix. A thin-film transistor which is a switching element is formed in each of the pixels. A pixel electrode corresponding to each of the pixels is formed on the thin-film transistor substrate 13.

The color filter substrate 14 is arranged so as to face the thin-film transistor substrate 13 through the liquid crystal layer. The color filter substrate 14 is a flexible substrate made of, e.g., resin and glass. A common electrode, a light shielding film, color filters, etc. are formed on the flexible substrate.

The thin-film transistor substrate 13 is formed so as to have an region larger than that of the color filter substrate 14. When bonding such substrates together, an extra region 17 of the thin-film transistor substrate 13 is formed. The followings are formed in the extra region 17: a drive circuit 18 for driving, e.g., the thin-film transistor; a flexible printed board 19 for transmitting/receiving signals to/from an external circuit; etc.

The front-side polarizer 16 is stacked on a front surface of the color filter substrate 14, and the rear-side polarizer 15 is stacked on a rear surface of the thin-film transistor substrate 13. The front-side polarizer 16 and the rear-side polarizer 15 are arranged parallel to the display surface 20 of the liquid crystal display panel 11. The front-side polarizer 16 and the rear-side polarizer 15 sandwich the liquid crystal layer so that their polarization directions are perpendicular or parallel to each other.

The front-side polarizer 16 serves as a scattering section where external light entering the liquid crystal display panel 11 is scattered. The front-side polarizer 16 defines a recessed curved surface having curvature of 1/500-1/50 (1 /mm)

A plurality of elongated regions (first to third regions A-C) having different haze values are formed from a middle section of the curved surface toward both end sections in the curving direction on a surface of the front-side polarizer 16, and are arranged in parallel with each other.

The "haze value" is a value represented by the following expression.

Haze Value(%)=(Total Light Transmittance(%)−Parallel Light Transmittance (%))/Total Light Transmittance(%)×100

Figure 3:
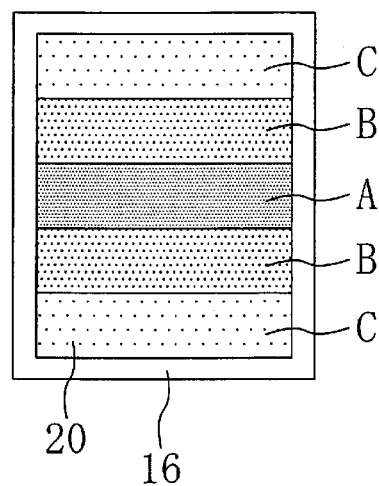
FIG. 3 is a plan view of the display surface of the liquid crystal display device of the first embodiment.

The haze values of the plurality of elongated regions arranged in parallel with each other can be decreased/increased from the middle section of the curved surface toward the both end sections in the curving direction by adjusting the degree of an anti-glare process. Specifically, as illustrated in FIG. 3, the elongated regions, i.e., the first region A, the second regions B, and the third regions C are used in order to decrease the haze values. The first region A is an region provided in the middle section of the curved surface, where the haze value is equal to or greater than 50% and less than 80%. The second regions B are regions adjoining the first region A in a direction toward the both end sections of the curved surface, where the haze value is equal to or greater than 30% and less than 50%. The third regions C are regions adjoining the second regions B in the direction toward the both end sections of the curved surface, where the haze value is equal to or greater than 0% and less than 30%. In order to increase the haze values, the haze values in the first and third regions A and C are switched.

In the first to third regions A-C of the front-side polarizer 16, fine recessed and raised sections having light diffusing capacity are formed across the entire surface by the anti-glare process, thereby scattering, e.g., external light.

More specifically, the front-side polarizer 16 has a configuration in which a polarizing film layer having transmission and absorption axes perpendicular to each other in a plan is bonded to an outer surface of a flexible base made of, e.g., resin through a transparent bonding layer. Fine silicic acid powder is dispersed in and mixed with a silicone hard-coat solution as transparent fine particles having an equal particle size in order to make a hard-coat liquid mixture, and such a hard-coat liquid mixture is applied to a surface of the polarizing film layer. As a result, a substantially transparent surface layer is formed, which includes the first to third regions A-C to which the anti-glare process is applied to uniformly form the fine recessed and raised sections.

As the transparent fine particles dispersed in and mixed with the hard-coat solution, the followings are preferably used other than the fine silicic acid powder: conductive inorganic fine particles containing, e.g., alumina, titania, zirconia, tin oxide, and indium oxide; and organic fine particles containing cross-linked or non-cross-linked polymer.

As the anti-glare process applied to the front-side polarizer 16, a technique for roughening a surface of the transparent surface layer by, e.g., sandblasting and embossing is preferably used other than the transparent fine particle mixing technique.

A brightness enhancement film is bonded to the recessed and raised surface of the surface layer formed on the front-side polarizer 16 to which the anti-glare process is applied, through the transparent bonding layer. The brightness enhancement film is an optical film having properties which, when light having a random polarization direction such as natural light enters the brightness enhancement film, allow selective reflection of linearly or circularly polarized light having a predetermined polarization direction, and allow transmission of other type of light. In such a case, examples of the brightness enhancement film which allows the selective reflection of linearly polarized light include a stacked body of dielectric multilayer thin films and thin films having different refractive index anisotropy. Examples of the brightness enhancement film which allows the selective reflection of circularly polarized light include a film in which a cholesteric liquid crystal layer is stacked on a film base; and an alignment film made of cholesteric liquid crystal polymer.

As in the front-side polarizer 16, the rear-side polarizer 15 includes a flexible base, a polarizing film layer, a surface layer, a brightness enhancement film, and transparent bonding layers for bonding such members together. The anti-glare process may or may not be applied to the rear-side polarizer 15. If the rear-side polarizer 15 to which the anti-glare process is applied is used, a plurality of elongated regions having different haze values may be provided in positions displaced from the plurality of elongated regions of the front-side polarizer 16 when viewing the liquid crystal display panel 11 in plan, and such region combinations may change the haze values from the middle section of the curved surface toward the both end sections.

The backlight 12 is provided on an lower surface of the liquid crystal display panel 11. The backlight 12 includes a light guide plate, a light source for irradiating the light guide plate with light, a reflection sheet, and a prism sheet. The light guide plate, the reflection sheet, and the prism sheet are made of, e.g., resin, and have flexibility. As the light source of the backlight 12, fluorescent lamps (cold-cathode tubes), LEDs, etc. are used. The light guide plate has a shape in which uniformity is enhanced with good efficiency, and a plurality of prisms etc. are formed on the light guide plate. The reflection sheet is provided on a lower surface of the light guide plate, and reflects light toward the light guide plate. The prism sheet is provided on an upper surface of the light guide plate, and adjusts incident light so as to exit toward the front.

(Manufacturing Method of Liquid Crystal Display Device 10)

Next, a manufacturing method of the liquid crystal display device 10 of the embodiment of the present invention will be described. Note that the manufacturing method described below is set forth merely for purposes of examples in nature, and the liquid crystal display device 10 of the present invention is not limited to the device manufactured by the method described below.

First, two flexible substrates having a thickness of, e.g., approximately 0.4 mm, and made of, e.g., resin are prepared. Then, a thin-film transistor array using, e.g., low-temperature polysilicon as an active layer, pixel electrodes, a drive circuit 18, etc. are formed on one of the flexible substrates, thereby preparing a thin-film transistor substrate 13. Subsequently, sealing material is applied in frame-like shape so as to surround a display region of the thin-film transistor substrate 13. The sealing material such as an epoxy adhesive is applied by a dispenser. Next, a common electrode made of, e.g., ITO, color filters, etc. are formed on the other flexible substrate, thereby preparing a color filter substrate 14. Then, a predetermined amount of liquid crystal molecules is provided to the region surrounded by the sealing material on the thin-film transistor substrate 13. Subsequently, the thin-film transistor substrate 13 and color filter substrate 14 are positioned so that the display region of the thin-film transistor substrate 13 and the common electrode of the color filter substrate 14 face each other. Predetermined pressure is applied to the thin-film transistor substrate 13 and the color filter substrate 14 to bond them together with the sealing material, and then the sealing material is cured to fix the thin-film transistor substrate 13 and the color filter substrate 14. If necessary, the bonded substrates including the thin-film transistor substrate 13 and the color filter substrate 14 are cut into a predetermined size.

Next, a front-side polarizer 16 and a rear-side polarizer 15 having a thickness of, e.g., 0.35 mm are bonded to front and rear surfaces of the bonded substrates through the bonding layers.

In a manufacturing process of the front-side polarizer 16, a polarizing film layer having transmission and absorption axes perpendicular to each other in a plan is first bonded to an outer surface of a flexible base made of, e.g., resin through a transparent bonding layer. Then, fine silicic acid powder is dispersed in and mixed with a silicone hard-coat solution as transparent fine particles having an equal particle size in order to make a hard-coat liquid mixture, and such a hard-coat liquid mixture is applied to a surface of the polarizing film layer. In such a state, a dispersion amount of the transparent fine particles is different in each of surface sections of the polarizing film layer, and therefore the polarizing film layer is divided into elongated regions, i.e., a first region A provided in a middle section of a curved surface, where a haze value is equal to or greater than 50% and less than 80%; second regions B adjoining the first region A in a direction toward both end sections of the curved surface, where the haze value is equal to or greater than 30% and less than 50%; and third regions C adjoining the second regions B in the direction toward the both end sections of the curved surface, where the haze value is equal to or greater than 0% and less than 30%. Subsequently, an optical retardation film is formed on a recessed and raised surface of a surface layer formed on the front-side polarizer 16 to which an anti-glare process is applied, through the transparent bonding layer, thereby preparing the front-side polarizer 16. The rear-side polarizer 15 is prepared in the similar manner to the front-side polarizer 16, and a brightness enhancement film is further formed on the rear-side polarizer 15.

In an extra region 17 of the thin-film transistor substrate 13 of the bonded substrates to which the front-side polarizer 16 and the rear-side polarizer 15 are bonded as described above, a flexible printed board 19 etc. are formed to provide a complete liquid crystal display panel 11.

Next, a backlight 12 is attached to a rear surface of the liquid crystal display panel 11, and then is fixed so as to define a recessed curved surface having curvature of 1/500-1/50 (1/mm) Thus, a complete liquid crystal display device 10 illustrated in FIG. 1 is provided.

(Features and Advantages of First Embodiment)

Next, features and advantages of the liquid crystal display device 10 of the first embodiment of the present invention will be described. The liquid crystal display device 10 includes the liquid crystal display panel 11 with the display surface 20 defining the recessed curved surface having the curvature of 1/500-1/50 (1 /mm); and with the scattering section which is arranged parallel to the display surface 20, which defines the recessed curved surface having the curvature of 1/500-1/50 (1 /mm), and in which the plurality of elongated regions A-C having the different haze values are arranged in parallel with each other from the middle section of the curved surface toward the both end sections in the curving direction. The haze values of the plurality of elongated regions A-C arranged in parallel with each other are increased/decreased from the middle section of the curved surface toward the both end sections in the curving direction depending on the curvature. Thus, in the middle section of the curved surface and sections therearound, brightness and contrast can be improved.

The haze values are set to predetermined values. Thus, the setting can be changed depending on applications such as setting of a privacy mode (view angle control) in which visibility is partially improved so that only a user can view an image, and the visibility is purposely reduced so that the image cannot be viewed by people around (e.g., people other than the user).

(Second Embodiment)

Figure 4:
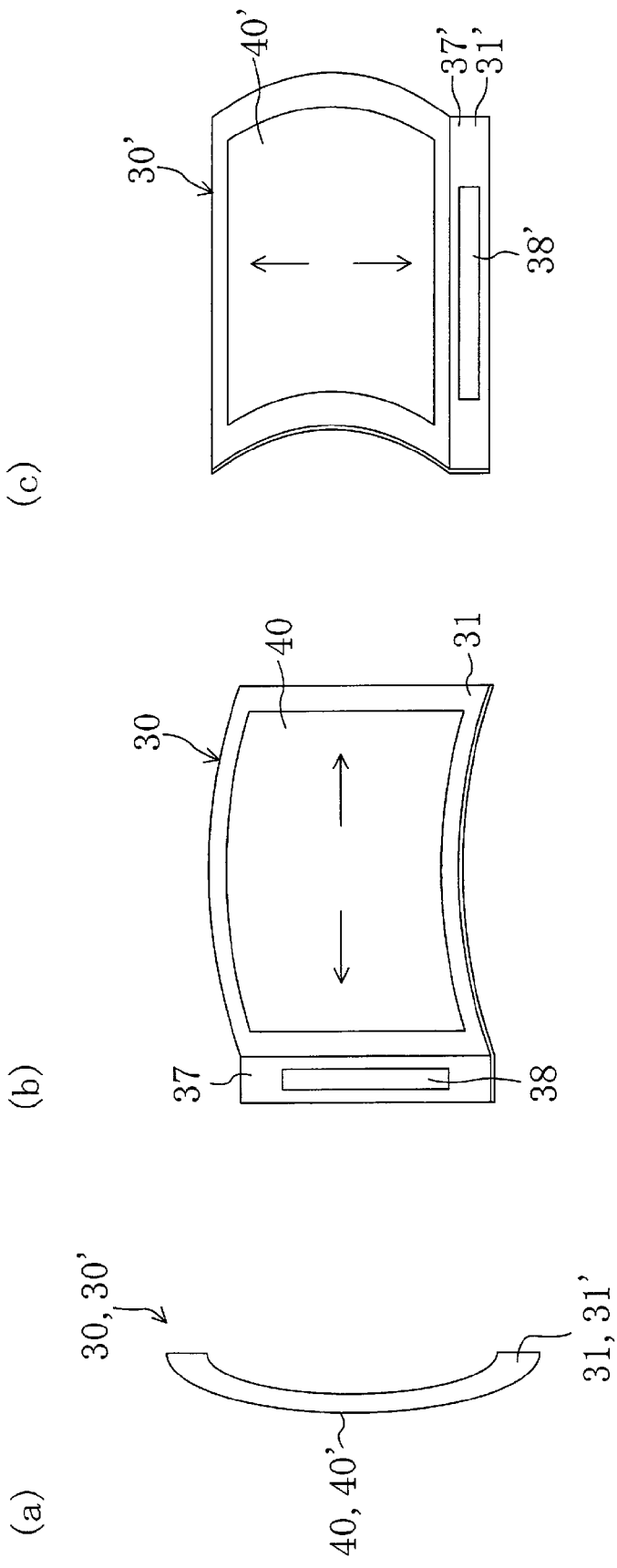
FIG. 4(a) is a side view of a liquid crystal display panel having a raised curved display surface.
FIG. 4(b) is a plan view of the liquid crystal display panel which is curved in the longitudinal direction so as to define the raised surface.
FIG. 4(c) is a plan view of the liquid crystal display panel which is curved in the lateral direction so as to define the raised surface.

Next, a liquid crystal display device 30 of a second embodiment of the present invention will be described. FIG. 4(a) is a view illustrating a shape of a display surface 40 of the liquid crystal display device 30 as viewed from the side. FIG. 4(b) is a plan view of the liquid crystal display device 30.

The liquid crystal display device 30 is different from the liquid crystal display device 10 of the first embodiment in that a surface is formed in raised shape, and therefore elongated regions (first to third regions D-F) are differently arranged on the surface.

Specifically, as illustrated in FIG. 4(b), the raised curved surface is defined on the display surface 40 side of a liquid crystal display panel 31, and the curving direction is a longitudinal direction (direction indicated by arrows in FIG. 4(b)) of the liquid crystal display panel 31. In FIG. 4(b), a reference number "37" represents an extra region of a thin-film transistor substrate, and a reference number "38" represents a drive circuit formed on the extra region 37.

As in a liquid crystal display device 30' illustrated in FIG. 4(c), a display surface 40' may define a raised curved surface, and the curving direction may be a lateral direction (direction indicated by arrows in FIG. 4(c)) of a liquid crystal display panel 31'. In FIG. 4(c), a reference number "37'" represents an extra region of a thin-film transistor substrate, and a reference number "38'" represents a drive circuit formed on the extra region 37'.

The curved surface is not limited to the above, and, e.g., a rectangular display surface of a liquid crystal display panel is curved in an oblique direction so as to define a raised surface.

The liquid crystal display device 30 includes the liquid crystal display panel 31 and a backlight. The display surface 40 of the liquid crystal display panel 31 defines a raised curved surface having curvature of 1/500-1/50 (1 /mm)

Figure 5:
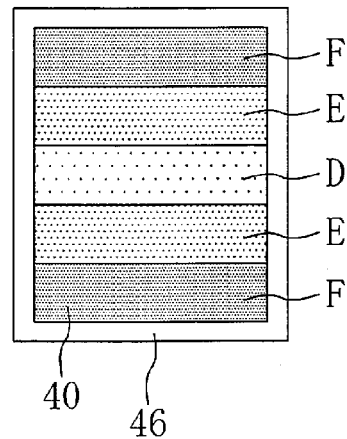
FIG. 5 is a plan view of a display surface of a liquid crystal display device of a second embodiment.

A front-side polarizer 46 (scattering section) defines a raised curved surface having curvature of 1/500-1/50 (1 /mm) A plurality of elongated regions having different haze values are formed from a middle section of the curved surface toward both end sections in the curving direction on a surface of the front-side polarizer 46, and such elongated regions are arranged in parallel with each other. The haze values of the plurality of elongated regions arranged in parallel with each other can be increased/decreased from the middle section of the curved surface toward the both end sections in the curving direction by adjusting the degree of an anti-glare process. Specifically, as illustrated in FIG. 5, the elongated regions, i.e., the first region D, the second regions E, and the third regions F are used in order to increase the haze values. The first region D is an region provided in the middle section of the curved surface, where the haze value is equal to or greater than 0% and less than 30%. The second regions E are regions adjoining the first region D in a direction toward the both end sections of the curved surface, where the haze value is equal to or greater than 30% and less than 50%. The third regions F are regions adjoining the second regions E in the direction toward the both end sections of the curved surface, where the haze value is equal to or greater than 50% and less than 80%. In order to decrease the haze values, the haze values in the first and third regions D and F are switched.

The anti-glare process is applied in the similar manner to that of the first embodiment. The anti-glare process may or may not be applied to a rear-side polarizer. If the rear-side polarizer to which the anti-glare process is applied is used, a plurality of elongated regions having different haze values may be provided in positions displaced from the plurality of elongated regions of the front-side polarizer 46 when viewing the liquid crystal display panel 31 in plan, and such region combinations may change the haze values from the middle section of the curved surface toward the both end sections.

(Features and Advantages of Second Embodiment)

Next, features and advantages of the liquid crystal display device 30 of the second embodiment of the present invention will be described. The liquid crystal display device 30 includes the liquid crystal display panel 31 with the display surface 40 defining the raised curved surface having the curvature of 1/500-1/50 (1 /mm); and with the scattering section which is arranged parallel to the display surface 40, which defines the raised curved surface having the curvature of 1/500-1/50 (1 /mm), and in which the plurality of elongated regions D-F having the different haze values are arranged in parallel with each other from the middle section of the curved surface toward the both end sections in the curving direction. The haze values of the plurality of elongated regions D-F arranged in parallel with each other are increased/decreased from the middle section of the curved surface toward the both end sections in the curving direction depending on the curvature. Thus, in the middle section of the curved surface and sections therearound, brightness and contrast can be improved.

The haze values are set to predetermined values. Thus, the setting can be changed depending on applications such as setting of a privacy mode (view angle control) in which visibility is partially improved so that only a user can view an image, and the visibility is purposely reduced so that the image cannot be viewed by people around (e.g., people other than the user).

(Third Embodiment)

Figure 6:
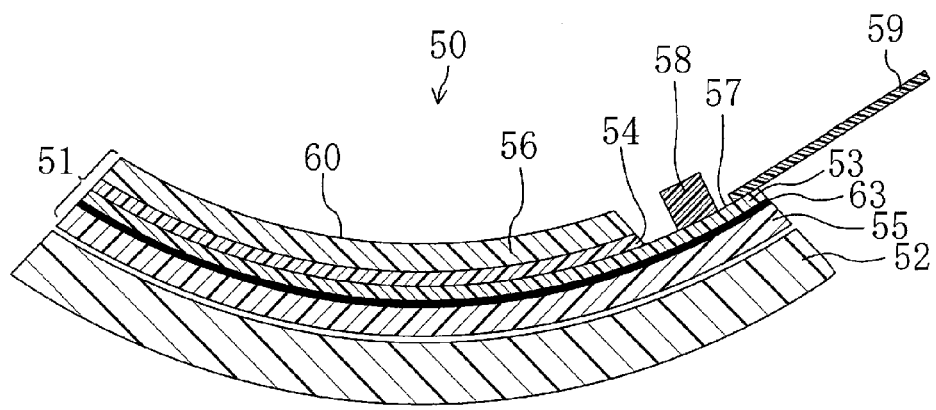
FIG. 6 is a cross-sectional view of a liquid crystal display device of a third embodiment.

Next, a liquid crystal display device 50 of a third embodiment of the present invention will be described. FIG. 6 is a cross-sectional view of the liquid crystal display device 50. The liquid crystal display device 50 includes a liquid crystal display panel 51 and a backlight 52.

The liquid crystal display panel 51 includes a thin-film transistor substrate 53, a color filter substrate 54, and a liquid crystal layer (not shown in the figure) interposed between the thin-film transistor substrate 53 and the color filter substrate 54; as well as a front-side polarizer 56 and a rear-side polarizer 55 arranged on outer surfaces of the thin-film transistor substrate 53 and the color filter substrate 54. Such members configuring the liquid crystal display panel 51 have flexibility, and the entire liquid crystal display panel 51 is curved and fixed. A display surface 60 of the liquid crystal display panel 51 defines a recessed curved surface having curvature of 1/500-1/50 (1 /mm)

The thin-film transistor substrate 53 is formed so as to have an region larger than that of the color filter substrate 54. When bonding such substrates together, an extra region 57 of the thin-film transistor substrate 53 is formed. The followings are formed in the extra region 57: a drive circuit 58 for driving, e.g., a thin-film transistor; a flexible printed board 59 for transmitting/receiving signals to/from an external circuit; etc.

The front-side polarizer 56 is stacked on a front surface of the color filter substrate 54, and the rear-side polarizer 55 is stacked on a rear surface of the thin-film transistor substrate 53. The front-side polarizer 56 and the rear-side polarizer 55 are arranged parallel to the display surface 60 of the liquid crystal display panel 51. The front-side polarizer 56 and the rear-side polarizer 55 sandwich the liquid crystal layer so that their polarization directions are perpendicular or parallel to each other. Each of the front-side polarizer 56 and the rear-side polarizer 55 has a configuration in which a polarizing film layer having transmission and absorption axes perpendicular to each other in a plan is bonded to an outer surface of a flexible base made of, e.g., resin through a transparent bonding layer.

A transparent bonding layer 63 is used to bond the rear-side polarizer 55 and the thin-film transistor substrate 53 together. The transparent bonding layer 63 is made of a haze adhesive, and serves as a scattering section. The transparent bonding layer 63 is provided so as to define a recessed curved surface having curvature of 1/500-1/50 (1 /mm) between the rear-side polarizer 55 and the thin-film transistor substrate 53.

The haze adhesive of the transparent bonding layer 63 is an adhesive containing scattering particles. Specifically, the haze adhesive is, e.g., a resin adhesive containing scattering particles such as conductive inorganic fine particles containing, e.g., fine silicic acid powder, alumina, titania, zirconia, tin oxide, and indium oxide, and organic fine particles containing cross-linked or non-cross-linked polymer.

Figure 7:
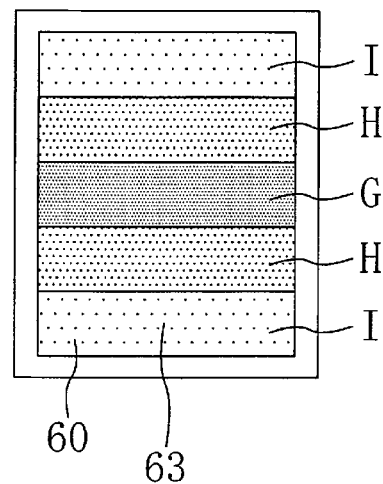
FIG. 7 is a plan view of a display surface of the liquid crystal display device of the third embodiment.

A plurality of elongated regions having different haze values are formed from a middle section of the curved surface toward both end sections in the curving direction on the transparent bonding layer 63, and such elongated regions are arranged in parallel with each other. The haze values of the plurality of elongated regions arranged in parallel with each other can be decreased/increased from the middle section of the curved surface toward the both end sections in the curving direction by adjusting the amount of the scattering particles contained in the adhesive. Specifically, as illustrated in FIG. 7, the elongated regions, i.e., a first region G, second regions H, and third regions I are used in order to decrease the haze values. The first region G is an region provided in the middle section of the curved surface, where the haze value is equal to or greater than 50% and less than 80%. The second regions H are regions adjoining the first region G in a direction toward the both end sections of the curved surface, where the haze value is equal to or greater than 30% and less than 50%. The third regions I are regions adjoining the second regions H in the direction toward the both end sections of the curved surface, where the haze value is equal to or greater than 0% and less than 30%. In order to increase the haze values, the haze values in the first and third regions are switched.

The haze adhesive containing the scattering particles may not be used for bonding the rear-side polarizer 55 and the thin-film transistor substrate 53 together, but may be used as a transparent bonding layer (scattering section) used for bonding stacked members configuring the rear-side polarizer 55. In such a case, the haze adhesive can be used for, e.g., bonding a polarizing film layer and a flexible base configuring the rear-side polarizer 55.

(Features and Advantages of Third Embodiment)

Next, features and advantages of the liquid crystal display device 50 of the third embodiment of the present invention will be described. The liquid crystal display device 50 includes the liquid crystal display panel 51 with the display surface 60 defining the recessed curved surface having the curvature of 1/500-1/50 (1 /mm); and with the scattering section which is arranged parallel to the display surface 60, which defines the recessed curved surface having the curvature of 1/500-1/50 (1 /mm), and in which the plurality of elongated regions G-I having the different haze values are arranged in parallel with each other from the middle section of the curved surface toward the both end sections in the curving direction. The haze values of the plurality of elongated regions G-I arranged in parallel with each other are increased/decreased from the middle section of the curved surface toward the both end sections in the curving direction depending on the curvature. Thus, in the middle section of the curved surface and sections therearound, brightness and contrast can be improved.

The haze values are set to predetermined values. Thus, the setting can be changed depending on applications such as setting of a privacy mode (view angle control) in which visibility is partially improved so that only a user can view an image, and the visibility is purposely reduced so that the image cannot be viewed by people around (e.g., people other than the user).

(Fourth Embodiment)

Next, a liquid crystal display device of a fourth embodiment of the present invention will be described. The liquid crystal display device is different from the liquid crystal display device 50 of the third embodiment in that a surface is formed in raised shape, and therefore elongated regions (first to third regions J-L) are differently arranged on the surface.

Figure 8:
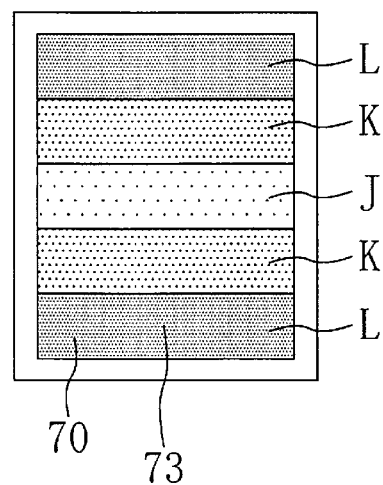
FIG. 8 is a plan view of a display surface of a liquid crystal display device of a fourth embodiment.

FIG. 8 is a plan view of a display surface 70 of the liquid crystal display device of the fourth embodiment of the present invention. The liquid crystal display device includes a liquid crystal display panel and a backlight. The display surface 70 of the liquid crystal display panel defines a raised curved surface having curvature of 1/500-1/50 (1 /mm)

A transparent bonding layer 73 is used to bond a rear-side polarizer 55 and a thin-film transistor substrate 53 together. The transparent bonding layer 73 is made of a haze adhesive, and serves as a scattering section. The transparent bonding layer 73 is provided so as to define a raised curved surface having curvature of 1/500-1/50 (1 /mm)between the rear-side polarizer and the thin-film transistor substrate.

As in the third embodiment, the haze adhesive of the transparent bonding layer 73 is an adhesive containing scattering particles. A plurality of elongated regions having different haze values are formed from a middle section of the curved surface toward both end sections in the curving direction on the transparent bonding layer 73, and such elongated regions are arranged in parallel with each other. The haze values of the plurality of elongated regions arranged in parallel with each other can be increased/decreased from the middle section of the curved surface toward the both end sections in the curving direction by adjusting the amount of the scattering particles contained in the adhesive. Specifically, as illustrated in FIG. 8, the elongated regions, i.e., the first region J, the second regions K, and the third regions L are used in order to increase the haze values. The first region J is an region provided in the middle section of the curved surface, where the haze value is equal to or greater than 0% and less than 30%. The second regions K are regions adjoining the first region J in a direction toward the both end sections of the curved surface, where the haze value is equal to or greater than 30% and less than 50%. The third regions L are regions adjoining the second regions K in the direction toward the both end sections of the curved surface, where the haze value is equal to or greater than 50% and less than 80%. In order to decrease the haze values, the haze values in the first and third regions J and L are switched.

The haze adhesive containing the scattering particles may not be used for bonding the rear-side polarizer and the thin-film transistor substrate together, but may be used as a transparent bonding layer (scattering section) used for bonding stacked members configuring the rear-side polarizer. In such a case, the haze adhesive can be used for, e.g., bonding a polarizing film layer and a flexible base configuring the rear-side polarizer.

(Features and Advantages of Fourth Embodiment)

Next, features and advantages of the liquid crystal display device of the fourth embodiment of the present invention will be described. The liquid crystal display device includes the liquid crystal display panel with the display surface 70 defining the raised curved surface having the curvature of $1/500$-$1/50$ (1 /mm); and with the scattering section which is arranged parallel to the display surface 70, which defines the raised curved surface having the curvature of $1/500$-$1/50$ (1 /mm), and in which the plurality of elongated regions J-L having the different haze values are arranged in parallel with each other from the middle section of the curved surface toward the both end sections in the curving direction. The haze values of the plurality of elongated regions J-L arranged in parallel with each other are increased/decreased from the middle section of the curved surface toward the both end sections in the curving direction depending on the curvature. Thus, in the middle section of the curved surface and sections therearound, brightness and contrast can be improved.

The haze values are set to predetermined values. Thus, the setting can be changed depending on applications such as setting of a privacy mode (view angle control) in which visibility is partially improved so that only a user can view an image, and the visibility is purposely reduced so that the image cannot be viewed by people around (e.g., people other than the user).

(Fifth Embodiment)

Figure 9:
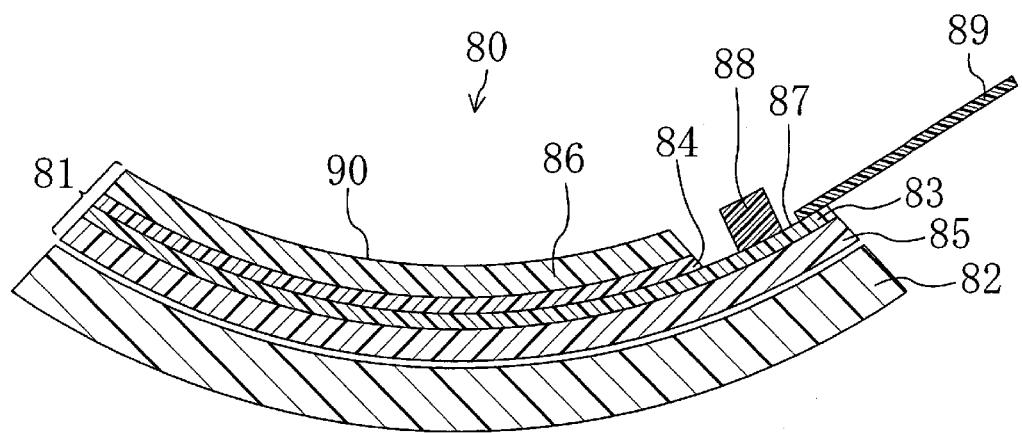
FIG. 9 is a cross-sectional view of a liquid crystal display device of a fifth embodiment.

Next, a liquid crystal display device 80 of a fifth embodiment of the present invention will be described. FIG. 9 is a cross-sectional view of the liquid crystal display device 80. The liquid crystal display device 80 includes a liquid crystal display panel 81 and a backlight 82.

The liquid crystal display panel 81 includes a thin-film transistor substrate 83, a color filter substrate 84, and a liquid crystal layer (not shown in the figure) interposed between the thin-film transistor substrate 83 and the color filter substrate 84; as well as a front-side polarizer 86 and a rear-side polarizer 85 arranged on outer surfaces of the thin-film transistor substrate 83 and the color filter substrate 84. Such members configuring the liquid crystal display panel 81 have flexibility, and the entire liquid crystal display panel 81 is curved and fixed. A display surface 90 of the liquid crystal display panel 81 defines a recessed curved surface having curvature of $1/500$-$1/50$ (1 /mm).

The thin-film transistor substrate 83 is formed so as to have an region larger than that of the color filter substrate 84. When bonding such substrates together, an extra region 87 of the thin-film transistor substrate 83 is formed. The followings are formed in the extra region 87: a drive circuit 88 for driving, e.g., a thin-film transistor; a flexible printed board 89 for transmitting/receiving signals to/from an external circuit; etc.

The front-side polarizer 86 is stacked on a front surface of the color filter substrate 84, and the rear-side polarizer 85 is stacked on a rear surface of the thin-film transistor substrate 83. The front-side polarizer 86 and the rear-side polarizer 85 are arranged parallel to the display surface 90 of the liquid crystal display panel 81.

The front-side polarizer 86 serves as a reflection section where external light entering the liquid crystal display panel 81 is scattered. The front-side polarizer 86 defines a recessed curved surface having curvature of $1/500$-$1/50$ (1 /mm)

A plurality of elongated regions having different light reflectivities are formed from a middle section of the curved surface toward both end sections in the curving direction on a surface of the front-side polarizer 86, and such elongated regions are arranged in parallel with each other.

Figure 10:
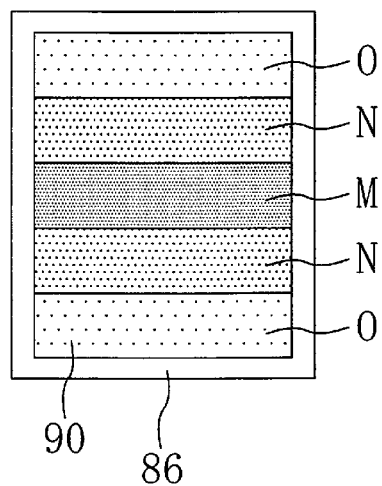
FIG. 10 is a plan view of a display surface of the liquid crystal display device of the fifth embodiment.

The light reflectivities of the plurality of elongated regions arranged in parallel with each other can be increased/decreased from the middle section of the curved surface toward the both end sections in the curving direction by adjusting the degree of a process for providing light reflecting properties. Specifically, as illustrated in FIG. 10, the elongated regions, i.e., a first region M, second regions N, and third regions O are used in order to increase the light reflectivities. The first region M is an region provided in the middle section of the curved surface, where the light reflectivity is equal to or greater than 0% and less than 5%. The second regions N are regions adjoining the first region M in a direction toward the both end sections of the curved surface, where the light reflectivity is equal to or greater than 5% and less than 10%. The third regions O are regions adjoining the second regions N in the direction toward the both end sections of the curved surface, where the light reflectivity is equal to or greater than 10% and less than 15%. In order to decrease the light reflectivities, the light reflectivities in the first and third regions M and O are switched.

By an anti-reflection process, the first to third regions M-O of the front-side polarizer 86 are provided with a function by which reflected light interferes with each other to be attenuated across the entire surface. Specifically, the front-side polarizer 86 has a configuration in which a polarizing film layer having transmission and absorption axes perpendicular to each other in a plan is bonded to an outer surface of a flexible base made of, e.g., resin through a transparent bonding layer. A dielectric thin film (anti-reflection film) which is an inorganic film is further provided on a surface of the polarizing film. The anti-reflection film is designed so that reflected light generated at an interface between the thin films upon incidence of light interferes with each other to be attenuated. The anti-reflection film is made by alternately stacking thin films having different refractive indexes, and has a structure in which e.g., a plurality of $SiO_2$ and $TiO_2$ layers having different thicknesses are stacked. The type, number, and thickness of the thin films of such a stacking structure are changed, thereby realizing the first to third regions M-O having the different light reflectivities.

As material of the anti-reflection film, the followings can be used other than the above-described materials: materials such as $CaF_2$, $MgF_2$, $Al_2O_3$, $CeO_2$, $SnO_2$, $In_2O_3$, $ZrO_2$, $TiO_2$, ZnS, and $Bi_2O_3$.

As in the front-side polarizer 86, the rear-side polarizer 85 includes a flexible base, a polarizing film layer, a surface layer, a brightness enhancement film, and transparent bonding layers for bonding such members together. As in the front-side polarizer 86, the anti-reflection process may or may not be applied to the rear-side polarizer 85. If the rear-side polarizer 85 to which the anti-reflection process is applied is used, a plurality of elongated regions having different light reflectivities may be provided in positions displaced from the plurality of elongated regions of the front-side polarizer 86 when viewing the liquid crystal display panel 81 in plan, and such region combinations may minutely change the light reflectivities from the middle section of the curved surface toward the both end sections.

(Features and Advantages of Fifth Embodiment)

Next, features and advantages of the liquid crystal display device 80 of the fifth embodiment of the present invention will be described. The liquid crystal display device 80 includes the liquid crystal display panel 81 with the display surface 90 defining the recessed curved surface having the curvature of 1/500-1/50 (1 /mm); and with the reflection section which is arranged parallel to the display surface 90, which defines the recessed curved surface having the curvature of 1/500-1/50 (1 /mm), and in which the plurality of elongated regions M-O having the different light reflectivities are arranged in parallel with each other from the middle section of the curved surface toward the both end sections in the curving direction. The light reflectivities of the plurality of elongated regions M-O arranged in parallel with each other are increased/decreased from the middle section of the curved surface toward the both end sections in the curving direction depending on the curvature. Thus, in the middle section of the curved surface and sections therearound, reflected glare etc. of external light are reduced, thereby improving contrast.

The light reflectivities are set to predetermined values. Thus, the setting can be changed depending on applications such as setting of a privacy mode (view angle control) in which visibility is partially improved so that only a user can view an image, and the visibility is purposely reduced, e.g., by increasing the reflected glare etc. of external light so that the image cannot be viewed by people around (e.g., people other than the user).

(Sixth Embodiment)

Figure 11:
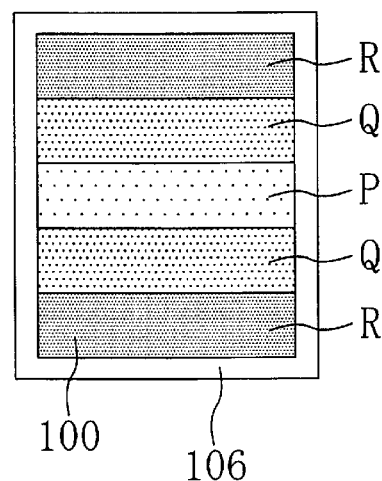
FIG. 11 is a plan view of a display surface of a liquid crystal display device of a sixth embodiment.

Next, a liquid crystal display device of a sixth embodiment of the present invention will be described. FIG. 11 is a plan view of a display surface 100 of the liquid crystal display device of the sixth embodiment. The liquid crystal display device of the sixth embodiment is different from the liquid crystal display device 80 of the fifth embodiment in that a surface is formed in raised shape, and therefore elongated regions (first to third regions P-Q) are differently arranged on the surface.

The liquid crystal display device of the sixth embodiment includes a liquid crystal display panel and a backlight. The display surface 100 of the liquid crystal display panel defines a raised curved surface having curvature of 1/500-1/50 (1 /mm).

A front-side polarizer 106 (light reflection section) defines a raised curved surface having curvature of 1/500-1/50 (1 /mm) A plurality of elongated regions having different light reflectivities are formed from a middle section of the curved surface toward both end sections in the curving direction on a surface of the front-side polarizer 106, and such elongated regions are arranged in parallel with each other. The light reflectivities of the plurality of elongated regions arranged in parallel with each other can be decreased/increased from the middle section of the curved surface toward the both end sections in the curving direction by adjusting the degree of an anti-reflection process. Specifically, as illustrated in FIG. 11, the elongated regions, i.e., the first region P, the second regions Q, and the third regions R are used in order to decrease the light reflectivities. The first region P is an region provided in the middle section of the curved surface, where the light reflectivity is equal to or greater than 10% and less than 15%. The second regions Q are regions adjoining the first region P in a direction toward the both end sections of the curved surface, where the light reflectivity is equal to or greater than 5% and less than 10%. The third regions R are regions adjoining the second regions Q in the direction toward the both end sections of the curved surface, where the light reflectivity is equal to or greater than 0% and less than 5%. In order to increase the light reflectivities, the light reflectivities in the first and third regions P and Q are switched.

The anti-reflection process is applied in the similar manner to that of the fifth embodiment. The anti-reflection process may or may not be applied to a rear-side polarizer. If the rear-side polarizer to which the anti-reflection process is applied is used, a plurality of elongated regions having different light reflectivities may be provided in positions displaced from the plurality of elongated regions of the front-side polarizer 106 when viewing the liquid crystal display panel in plan, and such region combinations may minutely change the light reflectivities from the middle section of the curved surface toward the both end sections.

(Features and Advantages of Sixth Embodiment)

Next, features and advantages of the liquid crystal display device of the sixth embodiment of the present invention will be described. The liquid crystal display device includes the liquid crystal display panel with the display surface 100 defining the raised curved surface having the curvature of 1/500-1/50 (1 /mm); and with the reflection section which is arranged parallel to the display surface 100, which defines the raised curved surface having the curvature of 1/500-1/50 (1 /mm), and in which the plurality of elongated regions P-R having the different light reflectivities are arranged in parallel with each other from the middle section of the curved surface toward the both end sections in the curving direction. The light reflectivities of the plurality of elongated regions P-R arranged in parallel with each other are increased/decreased from the middle section of the curved surface toward the both end sections in the curving direction depending on the curvature. Thus, in the middle section of the curved surface and sections therearound, reflected glare etc. of external light are reduced, thereby improving contrast.

The light reflectivities are set to predetermined values. Thus, the setting can be changed depending on applications such as setting of a privacy mode (view angle control) in which visibility is partially improved so that only a user can view an image, and the visibility is purposely reduced, e.g., by increasing the reflected glare etc. of external light so that the image cannot be viewed by people around (e.g., people other than the user).

INDUSTRIAL APPLICABILITY

As described above, the present invention is useful for the liquid crystal display device.

DESCRIPTION OF REFERENCE CHARACTERS

10, 10', 30, 30', 50, 80 Liquid Crystal Display Device
11, 11', 31, 31', 51, 81 Liquid Crystal Display Panel
12, 52, 82 Backlight
13, 53, 83 Thin-Film Transistor Substrate
14, 54, 84 Color Filter Substrate
15, 55, 85 Rear-Side Polarizer
16, 46, 56, 86, 106 Front-Side Polarizer
20, 20', 40, 40', 60, 70, 90, 100 Display Surface
63, 73 Transparent Bonding Layer

The invention claimed is:

1. A liquid crystal display device, comprising:
   a liquid crystal display panel with a display surface defining a recessed curved surface having curvature of 1/500-

1/50 (1/mm), and with a scattering section which is arranged parallel to the display surface, which defines a recessed curved surface having curvature of 1/500-1/50 (1/mm), and in which a plurality of elongated regions having different haze values are arranged in parallel with each other from a middle section of the curved surface toward both end sections in the curving direction, wherein the haze values of the plurality of elongated regions arranged in parallel with each other vary in a step-wise manner from the middle section of the curved surface toward the both end sections in the curving direction.

2. The liquid crystal display device of claim 1, wherein the elongated regions of the scattering section are a first region provided in the middle section of the curved surface, where the haze value is equal to or greater than 50% and less than 80%; second regions adjoining the middle section in a direction toward the both end sections of the curved surface, where the haze value is equal to or greater than 30% and less than 50%; and third regions adjoining the second regions in the direction toward the both end sections of the curved surface, where the haze value is equal to or greater than 0% and less than 30%; and the elongated regions of the scattering section are arranged so that the haze values are decreased from the middle section toward the both end sections in the curving direction.

3. The liquid crystal display device of claim 1, wherein the elongated regions of the scattering section are a first region provided in the middle section of the curved surface, where the haze value is equal to or greater than 0% and less than 30%; second regions adjoining the middle section in a direction toward the both end sections of the curved surface, where the haze value is equal to or greater than 30% and less than 50%; and third regions adjoining the second regions in the direction toward the both end sections of the curved surface, where the haze value is equal to or greater than 50% and less than 80%; and the elongated regions of the scattering section are arranged so that the haze values are increased from the middle section toward the both end sections in the curving direction.

4. The liquid crystal display device of claim 1, wherein the scattering section is a polarizer having a surface to which an anti-glare process is applied.

5. The liquid crystal display device of claim 4, wherein the polarizers are provided on front and rear sides of the liquid crystal display panel.

6. The liquid crystal display device of claim 1, wherein the scattering section is a haze adhesive which is an adhesive containing scattering particles.

7. The liquid crystal display device of claim 6, wherein the haze adhesive is used for bonding of the polarizer provided on the rear side of the liquid crystal display panel.

8. The liquid crystal display device of claim 6, wherein the haze adhesive is used for bonding of stacked members configuring the polarizer provided on the rear side of the liquid crystal display panel.

9. A liquid crystal display device, comprising:
a liquid crystal display panel with a display surface defining a raised curved surface having curvature of 1/500-1/50 (1/mm), and with a scattering section which is arranged parallel to the display surface, which defines a raised curved surface having curvature of 1/500-1/50 (1/mm), and in which a plurality of elongated regions having different haze values are arranged in parallel with each other from a middle section of the curved surface toward both end sections in the curving direction, wherein the haze values of the plurality of elongated regions arranged in parallel with each other vary in a step-wise manner from the middle section of the curved surface toward the both end sections in the curving direction.

10. The liquid crystal display device of claim 9, wherein the elongated regions of the scattering section are a first region provided in the middle section of the curved surface, where the haze value is equal to or greater than 0% and less than 30%; second regions adjoining the middle section in a direction toward the both end sections of the curved surface, where the haze value is equal to or greater than 30% and less than 50%; and third regions adjoining the second regions in the direction toward the both end sections of the curved surface, where the haze value is equal to or greater than 50% and less than 80%; and the elongated regions of the scattering section are arranged so that the haze values are increased from the middle section toward the both end sections in the curving direction.

11. The liquid crystal display device of claim 9, wherein the elongated regions of the scattering section are a first region provided in the middle section of the curved surface, where the haze value is equal to or greater than 50% and less than 80%; second regions adjoining the middle section in a direction toward the both end sections of the curved surface, where the haze value is equal to or greater than 30% and less than 50%; and third regions adjoining the second regions in the direction toward the both end sections of the curved surface, where the haze value is equal to or greater than 0% and less than 30%; and the elongated regions of the scattering section are arranged so that the haze values are decreased from the middle section toward the both end sections in the curving direction.

12. The liquid crystal display device of claim 9, wherein the scattering section is a polarizer having a surface to which an anti-glare process is applied.

13. The liquid crystal display device of claim 12, wherein the polarizers are provided on front and rear sides of the liquid crystal display panel.

14. The liquid crystal display device of claim 9, wherein the scattering section is a haze adhesive which is an adhesive containing scattering particles.

15. The liquid crystal display device of claim 14, wherein the haze adhesive is used for bonding of the polarizer provided on the rear side of the liquid crystal display panel.

16. The liquid crystal display device of claim 14, wherein the haze adhesive is used for bonding of stacked members configuring the polarizer provided on the rear side of the liquid crystal display panel.

* * * * *

UNITED STATES PATENT AND TRADEMARK OFFICE
CERTIFICATE OF CORRECTION

PATENT NO.       : 8,493,535 B2  
APPLICATION NO.  : 13/001635  
DATED            : July 23, 2013  
INVENTOR(S)      : Hiromi Enomoto Page 1 of 1

It is certified that error appears in the above-identified patent and that said Letters Patent is hereby corrected as shown below:

On the Title Page, Item (45) "*July 23, 2013" should read --July 23, 2013--.

On the Title Page under (*) Notice, line 4, please delete the statement of "This patent is subject to a terminal disclaimer" from the front page of the Patent.

Signed and Sealed this  
Sixth Day of May, 2014

Michelle K. Lee  
*Deputy Director of the United States Patent and Trademark Office*